(No Model.)

G. NIMMO.
MANUFACTURE OF SAW PLATES.

No. 443,785. Patented Dec. 30, 1890.

WITNESSES.
J. W. Bakewell
C. M. Clarke

INVENTOR.
George Nimmo

UNITED STATES PATENT OFFICE.

GEORGE NIMMO, OF ALLEGHENY, PENNSYLVANIA.

MANUFACTURE OF SAW-PLATES.

SPECIFICATION forming part of Letters Patent No. 443,785, dated December 30, 1890.

Application filed July 17, 1890. Serial No. 359,086. (No model.)

*To all whom it may concern:*

Be it known that I, GEORGE NIMMO, of Allegheny, in the county of Allegheny and State of Pennsylvania, have invented a new and useful Improvement in the Manufacture of Saw-Plates, of which the following is a full, clear, and exact description.

My invention relates to an improvement in the art of making saw-plates or similar articles, in which the outer portion of the plate is intended to do the greatest work, while the middle part is not subjected to the strains of the outer part and need not be of such strength. Heretofore steel ingots from which saw-plates are made have been cast in the usual way, the steel being poured into an upright oblong mold. As the steel ingot cools in such molds a pipe or concavity forms in the middle of its upper end, and as the ingot is intended to be rolled laterally into the form of a circular saw-plate, the pipe portion must first be cut off, since otherwise there would be a flaw in the plate which would utterly spoil its usefulness. In order to obviate this waste of material and to cheapen correspondingly the cost of manufacture, I cast the ingot in the form of a cheese, preferably round in cross-section, and in such manner that the pipe shall form only at the middle portion, and instead of rolling it laterally I reduce it by rolling or hammering it endwise into the form of a plate. The consequence is that the piped portion is at the middle only of the plate, and is almost effaced by the act of rolling or hammering, while the outer portion and edge of the plate is constituted by sound metal. In use almost the entire strain is put upon the outer portion of a saw, which must be sound in order that the teeth may be of strong flawless material, while a flaw at the center does not affect the usefulness of the saw and may be cut out almost entirely when the eye or spindle hole of the saw is punched. I prefer that the cheese or ingot be cast of circular cross-section, since a plate made from such ingot may be caused in rolling to preserve the same circular shape and may be utilized with very little shearing of the edges. My invention, broadly considered, is not limited thereto, since the ingot may be square or of other polygonal shape in cross-section.

The apparatus which I prefer to use in casting such ingots is illustrated in the accompanying drawings, in which—

Figure 3:
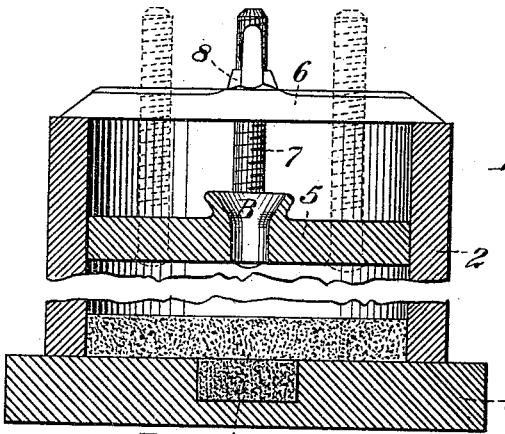
Figure 2:
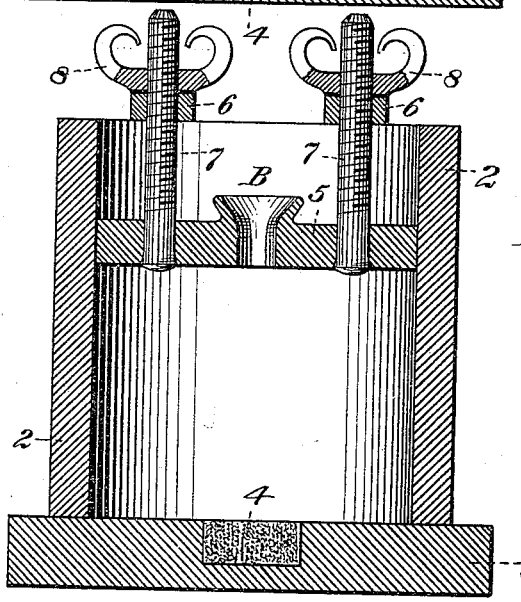
Figure 1:
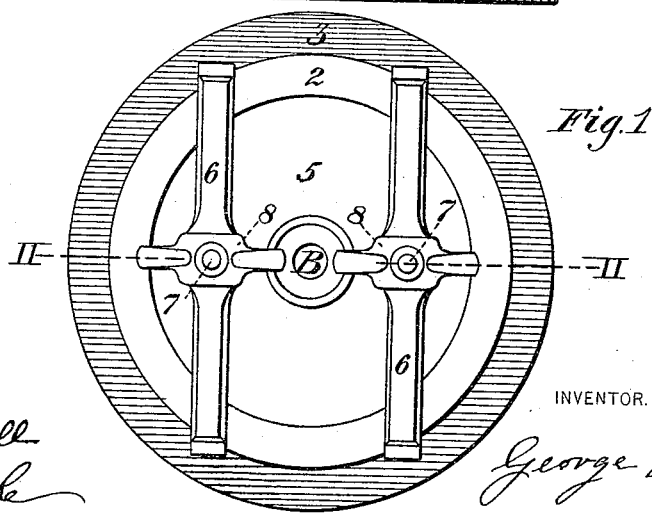

Figure 1 is a plan view of the mold. Fig. 2 is a vertical cross-section on the line II II of Fig. 1, and Fig. 3 is a similar section at right angles to Fig. 2.

2 is the mold, which may be of the form and proportions shown.

3 is the bottom-plate, which, in order to avoid blow-holes, may be provided with a secondary bottom piece 4, made conveniently of fire-clay, or plumbago and fire-clay, or other porous refractory material.

5 is a cover-plate, which is adjustably supported within the mold on a cross-bar 6, from which it may be suspended by rods 7. These rods may be fitted with nuts 8, enabling the plate to be adjusted vertically in the mold; but it will be understood that other adjusting appliances—such as keys—may be employed. By adjusting this plate in the mold it may be adapted to form ingots of any desired thickness, thus enabling one mold to be used for making ingots for saw-plates of various sizes instead of having a separate mold for each size, as has heretofore been customary. The plate has a central hole B, through which the metal may be teemed into the mold.

In using the mold I set the cover-plate therein, and having adjusted it to suit the size of the ingot to be made I pour the metal through the hole B until the mold and the hole are full. The pipe in the ingot then forms directly under the hole.

The advantages of my invention will be appreciated by those skilled in the art, and have been indicated generally in the foregoing specification.

I claim—

An improvement in reducing piped ingots into saw-plates, which consists in casting a cheese ingot with its central axis in a vertical position, whereby the piped portion forms in the line of said axis, said ingot containing the amount of material desired in the finished plate, and then reducing the ingot endwise into plate form by compression exerted in the direction of its central axis, whereby the piped portion forms the center of the plate, substantially as and for the purposes described.

In testimony whereof I have hereunto set my hand this 10th day of July, A. D. 1890.

GEORGE NIMMO.

Witnesses:
W. B. CORWIN,
C. M. CLARKE.